United States Patent
Akiyama et al.

(10) Patent No.: US 6,329,461 B1
(45) Date of Patent: Dec. 11, 2001

(54) SILICONE-CONTAINING AQUEOUS COATING COMPOSITION AND METHOD OF PRODUCING SAME

(75) Inventors: Mamoru Akiyama; Teruhiko Ogawa; Akio Kitagawa; Masayuki Kyogoku, all of Ibaraki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/365,825

(22) Filed: Aug. 3, 1999

(30) Foreign Application Priority Data

Aug. 5, 1998 (JP) .................................................. 10-220941

(51) Int. Cl.$^7$ ....................................................... C08K 3/20
(52) U.S. Cl. .......................... 524/730; 524/806; 524/811; 524/833; 524/832; 524/836
(58) Field of Search .................................. 524/730, 731, 524/832, 806, 811, 833, 836

(56) References Cited

U.S. PATENT DOCUMENTS 4,965,312  *  10/1990  Nakai et al. .......................... 524/506
5,776,565  *  7/1998   Volpe et al. .......................... 428/34.2
5,840,428  *  12/1998  Blizzard et al. ...................... 428/412
5,852,095  *  12/1998  Yamauchi et al. .................... 524/460

FOREIGN PATENT DOCUMENTS 3-227312   10/1991  (JP) .
5-25354    2/1993   (JP) .
6-145453   5/1994   (JP) .

* cited by examiner

Primary Examiner—Margaret G. Moore
(74) Attorney, Agent, or Firm—Armstrong, Westerman, Hattori, McLeland & Naughton LLP

(57) ABSTRACT

A method of producing silicone-containing aqueous coating compositions excellent in shelf stability of the emulsion and in weather resistance, stain resistance, water resistance and solvent resistance of coatings derived therefrom is provided. The method comprises subjecting an aqueous emulsion prepared in advance by emulsification in an aqueous medium containing a polyalkoxypolysiloxane (A), an unsaturated monomer (B) and an emulsifier (C) so as to attain an oil droplet diameter not more than 1,000 nm to polymerization in the presence of a polymerization initiator (D).

7 Claims, No Drawings

SILICONE-CONTAINING AQUEOUS COATING COMPOSITION AND METHOD OF PRODUCING SAME

FIELD OF THE INVENTION

The present invention relates to a method of producing aqueous coating compositions excellent in shelf stability of emulsion and in weather resistance, stain resistance, water resistance and solvent resistance of coatings and, more particularly, to a method of producing aqueous coating compositions useful as building material coating compositions, adhesives or paper coating compositions.

PRIOR ART

Polyalkoxypolysiloxanes or tetraalkoxysilanes and resins comprising an alkoxysilyl (hydrolyzable silyl)-containing monomer, in particular acrylsilicone resins, have ordinary curing properties and form highly hard coatings excellent in performance characteristics such as weather resistance and stain resistance. Therefore, they have been used as adhesives, binders for coatings and paper coating compositions.

In Japanese Kokai Tokkyo Koho H06-145453, for example, there are disclosed hydrophilic curable compositions comprising an alkoxysilyl-containing acrylic copolymer, a tetraalkyl silicate (tetraalkoxysilane) and/or a condensate derived therefrom and a curing catalyst and it is described that since the coating surface becomes hydrophilic, contaminants can be washed away by rainwater or the like, hence effective stain resistance can result.

In recent years, however, attempts have been made, in the fields of paints and adhesives, to change over the resins from those for which organic solvents are used to aqueous or water-dispersible resins from the viewpoints of antipollution policy or saving of resources. The technology disclosed in the above-cited publication, however, mainly consists in polymerization in organic solvent systems and, in aqueous systems, it hardly allows stable polymerization and requires fairly advanced techniques for the production of desired emulsions Various attempts have been made with respect to polymerization in such aqueous systems. As examples of emulsion polymerization using alkoxysilyl-containing monomers, emulsions resulting from emulsion polymerization of an alkyl methacrylate, an alkoxysilane group-containing monomer, acrylamide, etc. are disclosed in Japanese Kokai Tokkyo Koho H03-227312 and reactive type resin emulsions comprising a resin containing at least one hydrolyzable silyl group and at least one amine imide group in each molecule are disclosed in Japanese Kokai Tokkyo Koho H05-25354. Although these technologies disclosed can indeed improve the weather resistance and solvent resistance, further improvements are required, however. In particular, emulsions satisfactory in stain resistance have not been obtained as yet with such technologies. Therefore, for making improvements in these aspects, the present inventors made various investigations based on the finding that the use of polyalkoxypolysiloxanes is essential.

However, in the polymerization of polyalkoxypolysiloxanes in aqueous systems, the polyalkoxypolysiloxanes can hardly be stable in aqueous media, as mentioned above, and the emulsion polymerization process in general use, namely the process comprising dispersing by emulsification a polyalkoxypolysiloxane and a polymerizable monomer in an emulsifier-containing aqueous medium and carrying out the polymerization with heating in the presence of an initiator while charging said emulsified dispersion, is disadvantageous in that the polyalkoxypolysiloxane cannot be stably introduced into emulsion particles, hence the desired emulsions can hardly be obtained. Therefore, it was revealed that further studies are required for the development of a method of producing silicone-containing aqueous emulsions having good shelf stability and giving coatings excellent in weather resistance, water resistance, solvent resistance and stain resistance.

SUMMARY OF THE INVENTION

As a result of intensive investigations made by the present inventors in an attempt to solve such problems, it was found that the above problems can be solved by the silicone-containing aqueous coating composition (hereinafter briefly referred to as coating composition) obtained by subjecting an aqueous emulsion prepared in advance by emulsification in an aqueous medium containing a polyalkoxypolysiloxane (A), an unsaturated monomer (B) and an emulsifier (C) so as to attain an oil droplet diameter not more than 1,000 nm to polymerization in the presence of a polymerization initiator (D). It was also found that the combined use, in the aqueous medium, of an unsaturated monomer (E) containing at least one functional group, which is a hydrolyzable silyl group, a hydroxyl group or an epoxy group, results in further improvements in weather resistance, water resistance and solvent resistance and, further, that the use (in lieu of the polyalkoxypolysiloxane (A)) of a partial condensate of a polyalkoxypolysiloxane (A) or a tetraalkoxysilane (A') and an unsaturated monomer (E) containing at least one functional group, which is a hydrolyzable silyl group, a hydroxyl group or an epoxy group, results in marked improvements in stain resistance and improvements in the odor of emulsions. Based on these findings, the present invention has now been completed.

DETAILED DESCRIPTION OF THE INVENTION

In the following, the present invention is described more specifically.

First, the materials to be used in the practice of the present are described. The polyalkoxypolysiloxane (A) to be used in the present invention includes those represented by the general formula (1) given below, without any particular restriction.

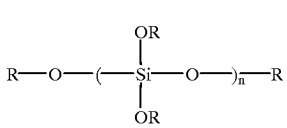

(1)

In the above formula, n represents the mean degree of condensation and is a value of 2 or more and it may be such that the above compound have fluidity at ordinary temperature. R represents an alkyl, aryl or aralkyl group (preferably an alkyl group). The R groups may be the same or different in the number of carbon atoms and may be straight or branched. The number of carbon atoms is preferably 1 to 10 (more preferably 1 to 5).

As specific examples of the above (A), there may be mentioned polymethoxypolysiloxane, polyethoxypolysiloxane, polypropoxypolysiloxane, polybutoxypolysiloxane and the like. In view of the fact that stain resistance, water resistance and solvent resistance are manifested in a short time, polymethoxypolysiloxane and polyethoxypolysiloxane are preferred.

The tetraalkoxysilane (A') to be used in the present invention specifically includes tetramethoxysilane, tetraethoxysilane, tetrapropoxysilane, tetrabutoxysilane and the like. In view of the fact that stain resistance, water resistance and solvent resistance are manifested in a short time, tetramethoxysilane and tetraethoxysilane are preferred.

The method of producing the above (A) is not critical. It can be obtained by hydrolyzing (condensing) a tetraalkoxysilane such as tetramethoxysilane, tetraethoxysilane, tetrapropoxysilane or tetrabutoxysilane and the value n in the above general formula (1) can be adjusted by controlling the degree of hydrolysis.

The hydrolysis reaction itself can be carried out in a per se known manner. For example, it is possible, after addition of a predetermined amount of water to such tetraalkoxysilane, to carry out the reaction in the presence of an acid catalyst at about room temperature to 100° C. while distilling off the byproduct alcohol. The degree of hydrolysis can be adjusted by means of the amount of water used to an extent such that the condensate has fluidity and is soluble in the unsaturated monomer (B) to be mentioned later herein.

The unsaturated monomer (B) to be used in the present invention may be any one capable of radical polymerization, without any particular restriction. As specific examples, there may be mentioned styrene, methyl (meth)acrylate, ethyl (meth)acrylate, isopropyl (meth)acrylate, n-butyl (meth)acrylate, isobutyl (meth)acrylate, 2-ethylhexyl acrylate, n-hexyl methacrylate, lauryl methacrylate, vinyl acetate, vinyl tert-decanoate, tridecyl (meth)acrylate, stearyl (meth)acrylate, hexyl (meth)acrylate, cyclohexyl (meth)acrylate, octyl (meth)acrylate, isobornyl (meth)acrylate, dicyclopentadienyl (meth)acrylate, vinyltoluene, (meth)acrylonitrile, dialkyl itaconates, dialkyl fumarates, dialkyl maleates, allyl chloride, acetoacetylated (meth)acrylates, (meth)acrylamide, (meth) acrylic acid, crotonic acid, fumaric acid, maleic acid (anhydride), itaconic acid, citraconic acid, ricinolic acid and like carboxyl-containing monomers, and salts of these (amine salts, sodium salts, potassium salts), among others. These may be used either singly or as a mixture of two or more of them. Preferred among them are styrene, methyl (meth)acrylate, ethyl acrylate, n-butyl (meth)acrylate, 2-ethylhexyl acrylate, vinyl acetate, (meth)acrylic acid (ammonium salt, diethylamine salt), crotonic acid (ammonium salt, diethylamine salt) and itaconic acid (ammonium salt, diethylamine salt).

The emulsifier (C) to be used in the present invention may be any one capable of functioning to emulsify the respective components, namely polyalkoxypolysiloxane (A) and unsaturated monomer (B) in an aqueous medium, without any particular restriction, and includes reactive (ionic or nonionic) surfactants, nonreactive (ionic or nonionic) surfactants and so forth. From the viewpoint of water resistance of coatings, reactive surfactants are preferred.

The reactive surfactant may be an ionic or nonionic surfactant having radical reactivity with (A) and (B) [or (E)]. As such reactive surfactant, there may be mentioned those having the following general formulas (2) to (7), respectively:

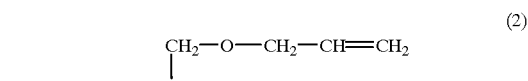

(2)

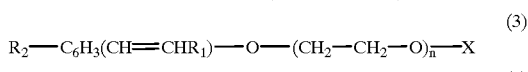

(3)

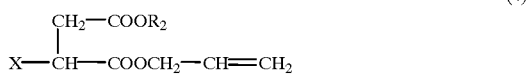

(4)

(5)

(6)

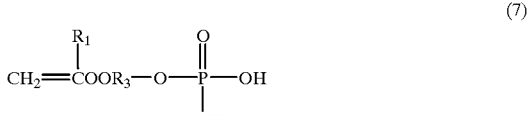

(7)

In the formulas 2 to 7, $R_1$ represents H or $CH_3$, $R_2$ represents an alkyl group, $R_3$ represents an alkylene group, n represents an integer of not less than 1 and X represents H, $SO_3NH_4$ or $SO_3Na$.

As specific examples of such surfactants, there may be mentioned such commercial products as Adeka Realeep SE-20N (anionic), Adeka Realeep SE-10N (anionic), Adeka Realeep NE-10 (nonioic), Adeka Realeep NE-20 (nonionic) and Adeka Realeep NE-30 (nonionic) (products of Asahi Denka Kogyo); Eleminol JS-2 (anionic) and Eleminol RS-30 (anionic) (products of Sanyo Chemical Industries); Latemul S-180A (anionic) and Latemul S-120A (anionic) (products of Kao Corp.); Aqualon BC-05 (anionic), Aqualon BC-10 (anionic), Aqualon BC-20 (anionic), Aqualon HS-05 (anionic), Aqualon HS-10 (anionic), Aqualon HS-20 (anionic), Aqualon RN-10 (nonionic), Aqualon RN-20 (nonionic) Aqualon RN-30 (nonionic), Aqualon RN-50 (nonionic) and New Frontier S-510 (anionic) (products of Daiichi Kogyo Seiyaku); and Phosphinol TX (anionic) (product of Toho Chemical Industry).

In the practice of the present invention, it is also preferred that an unsaturated monomer (E) containing at least one functional group, which is a hydrolyzable silyl, hydroxyl or epoxy group, in particular a hydrolyzable silyl-containing unsaturated monomer, be further contained in the polymerization system.

As said hydrolyzable silyl-containing unsaturated monomer, there may be mentioned β-(meth)acryloyloxyethyltrimethoxysilane, β-(meth)acryloyloxyethyltriethoxysilane, γ-(meth)acryloyloxypropyltrimethoxysilane, γ-(meth)acryloyloxypropyltriethoxysilane, γ-(meth)acryloyloxypropylmethyldimethoxysilane, γ-(meth)acryloyloxypropyldimethylmethoxysilane, γ-(meth)acryloyloxypropylmethyldiethoxysilane, γ-(meth)acryloyloxypropyldimethylethoxysilane, γ-(meth)acryloyloxypropyltrichlorosilane, γ-(meth)acryloyloxypropylmethyldichlorosilane, γ-(meth)acryloyloxypropyldimethylchlorosilane, γ-(meth)acryloyloxypropyltripropoxysilane, γ-(meth)

acryloyloxypropylmethyldipropoxysilane, γ-(meth)acryloyloxypropyltributoxysilane, γ-(meth)acryloyloxybutyltrimethoxysilane, γ-(meth)acryloyloxypentyltrimethoxysilane, γ-(meth)acryloyloxyhexyltrimethoxysilane, γ-(meth)acryloyloxyhexyltriethoxysilane, γ-(meth)acryloyloxyoctyltrimethoxysilane, γ-(meth)acryloyloxydecyltrimethoxysilane, γ-(meth)acryloyloxydodcyltrimethoxysilane, γ-(meth)acryloyloxyoctadecyltrimethoxysilane, vinyltrimethoxysilane, vinyltriethoxysilane, vinyltripropoxysilane, vinylmethyldimethoxysilane, vinylmethyldiethoxysilane, vinylmethyldipropoxysilane and the like. Preferred among them are β-(meth)acryloyloxyethyltrimethoxysilane, β-(meth)acryloyloxyethyltriethoxysilane, γ-(meth)acryloyloxypropyltrimethoxysilane, γ-(meth)acryloyloxypropyltriethoxysilane, γ-(meth)acryloyloxypropylmethyldimethoxysilane, γ-(meth)acryloyloxypropyldimethylmethoxysilane, γ-(meth)acryloyloxypropylmethyldiethoxysilane, γ-(meth)acryloyloxypropyldimethylethoxysilane, γ-(meth)acryloyloxybutyltrimethoxysilane, γ-(meth)acryloyloxypentyltrimethoxysilane, γ-(meth)acryloyloxyhexyltrimethoxysilane, γ-(meth)acryloyloxyoctyltrimethoxysilane, γ-(meth)acryloyloxydecyltrimethoxysilane, γ-(meth)acryloyloxydodecyltrimethoxysilane, γ-(meth)acryloyloxyoctadecyltrimethoxysilane, vinyltrimethoxysilane, vinyltriethoxysilane, vinylmethyldimethoxysilane and vinylmethyldiethoxysilane.

As the hydroxyl-containing monomer, there may be mentioned 2-hydroyethyl (meth)acrylate, 2-hydroxypropyl (meth)acrylate, ethylcarbitol acrylate, tripropylene glycol (meth)acrylate, 1,4-butylene glycol mono(meth)acrylate, 2-hydroxy-3-chloropropyl (meth)acrylate, glycerol mono (meth)acrylate, glycerol di(meth)acrylate, 2-hydroxyethyl acryloyl phosphate, 4-hydroxybutyl acrylate, caprolactone-modified 2-hydroxyethyl acrylate, polyethylene glycol mono(meth)acrylate, polypropylene glycol mono(meth) acrylate, 2-hydroxy-3-phenoxypropyl acrylate, 2-acryloyloxyethyl succinate, allyl alcohol, N-methylol (meth)acrylamide and the like. Preferred are 2-hydroxyethyl (meth)acrylate, 2-hydroxypropyl (meth)acrylate, N-methylol(meth)acrylamide and allyl alcohol.

As the epoxy-containing monomer, there may be mentioned glycidyl (meth)acrylate, allyl glycidyl ether, N-(4-(2, 3-epoxypropoxy)-3,5-dimethylbenzyl)acrylamide, bisphenol A diglycidyl ether mono(meth)acrylate and the like. Preferred are glycidyl (meth)acrylate and allyl glycidyl ether.

Furthermore, in accordance with the present invention, a partial condensate of a polyalkoxypolysiloxane (A) or a tetraalkoxysilane (A') and an unsaturated monomer (E) containing at least one functional group, which is a hydrolyzable silyl group, a hydroxyl group or an epoxy group is preferably used in lieu of the polyalkoxypolysiloxane (A) mentioned above. Said partial condensate is obtained by reacting the above-mentioned (A) or (A') with (E) in the presence of water and a catalyst and then distilling off the byproduct alcohol. Such method is described in the following.

The reactant weight ratio between (A) or (A') and (E) is preferably 1/10 to 10/0.1, more preferably 5/10 to 10/1. When said ratio is less than 1/10, the coatings obtained from the coating composition will be insufficient in stain resistance, weather resistance, solvent resistance and/or water resistance. When said ratio exceeds 10/0.1 the coatings obtained from the coating composition will be low in weather resistance, water resistance and/or solvent resistance and, furthermore, the odor resulting form low molecular weight components of (A) may unfavorably be strong in some instances.

The amount of water to be used is 0.1 to 50 parts by weight, preferably 0.5 to 30 parts by weight, relative to 100 parts by weight of the total amount of (A) or (A') and (E). When said amount is less than 0.1 part by weight, the condensation of (A) or (A') with (E) will be insufficient. When it exceeds 50 parts by weight, a high viscosity will result and, furthermore, a decreased solubility in the unsaturated monomer (B) will unfavorably result.

The catalyst to be used in the partial condensation may be an acidic functional group-containing compound soluble in (A) or (A') and in (E), including inorganic acids, organic acids, monomers, polymers and the like containing a carboxylic acid group, a sulfonic acid group, a sulfonic acid group or a phosphoric acid group as said acidic functional group. As specific examples of said catalyst, there may be mentioned p-toluenesulfonic acid, sulfuric acid, formic acid, acetic acid, phosphoric acid and the like. The amount of said catalyst is 0.1 to 20 parts by weight, preferably 0.3 to 10 parts by weight, per 100 parts of the total amount of (A) and (E). When said amount is less than 0.1 part by weight, a long period of time will be required for the condensation reaction or the condensation reaction will not proceed in certain instances. An amount exceeding 20 parts by weight is unfavorable since the stability in the step of polymerization may be reduced and/or the coatings obtained from the resulting coating composition may acquire reduced water resistance.

In the reaction step, an alcohol or the like may be used as a diluent.

The reaction temperature for the partial condensation is preferably 0 to 100° C., more preferably 10 to 80° C., and the reaction time is preferably 1 to 50 hours, more preferably 10 to 40 hours.

After condensation reaction, the alcohol produced by the condensation (and the alcohol as diluent) may be distilled off at 30 to 100° C. under reduced pressure or at ordinary pressure until the amount thereof is reduced to 5% by weight or below.

If necessary, the thus-obtained partial condensate is preferably neutralized with a base. The neutralization is carried out directly after the condensation reaction or after distilling off the alcohol mentioned above.

As said base, there may be mentioned ammonia, N,N-dimethylethanolamine, diethylamine, triethylamine, morpholine, 2-dimethylamino-2-methyl-1-propanol, monoisopropanolamine, monoethanolamine, N,N-diethylethanolamine, 2-amino-2-methyl-1-propanol, N-methyldiethanolamine, diisopropanolamine, N-ethyldiethanolamine, triisopropanolamine, triethanolamine and the like. The use of ammonia or diethylamine is preferred, however.

Said base may be added directly in the form of an aqueous solution or an alcohol solution or a mixed solution in water and alcohol. The level of addition is 50 to 110 equivalent percent relative to the amount required for neutralization, and the neutralization is carried out with stirring at 0 to 100° C. for about 1 to 3 hours.

The polymerization initiator (D) to be used in the present invention may be any water-soluble or oil-soluble one, without any particular restriction. Specifically, there may be mentioned organic peroxides such as alkyl peroxides, tert-butyl hydroperoxide, cumene hydroperoxide, p-menthane hydroperoxide, isobutyl peroxide, lauroyl peroxide, 3,5,5-trimethylhexanoyl peroxide, octanoyl peroxide, tert-butyl cumyl peroxide, benzoyl peroxide, dichlorobenzoyl peroxide, dicumyl peroxide, di-tert-butyl peroxide, 1,1-bis(tert-butylperoxy)-3,3,5-trimethylcyclohexane, 3,3,5-trimethylcyclohexanone peroxide, methylcyclohexanone peroxide, diisobutyl peroxydicarbonate, di-2-ethylhexyl peroxydicarbonate, tert-butyl peroxyisobutyrate and the like, azobisisobutyronitrile, dimethyl azodiisobutyrate, 2,2'-azobis(2,4-dimethylvaleronitrile), 2,2'-azobis(2-methylbutyronitrile), potassium persulfate, sodium persulfate, ammonium persulfate, hydrogen peroxide, 4,4'-azobis-4-cyanovaleric acid ammonium (or amine) salt, 2,2'-azobis(2-methylamidoxime) dihydrochloride, 2,2'-azobis(2-methylbutanamidoxime) dihydrochloride tetrahydrate, 2,2'-azobis[2-methyl-N-[1,1-bis(hydroxymethyl)-2-hydroxyethyl]propionamide], 2,2'-azobis[2-methyl-N-(2-hydroxyethyl)propionamide], various redox system catalysts (in this case, the oxidizing agent to be used is ammonium persulfate, potassium persulfate, hydrogen peroxide, tert-butyl hydroperoxide, benzoyl peroxide, cumene hydroperoxide, p-menthane hydroperoxide or the like, and the reducing agent to be used is sodium sulfite, sodium hydrogen sulfite, Rongalite, ascorbic acid or the like) and so forth. Among them, azobisisobutyronitrile, 2,2'-azobis[2-methyl-N-(2-hydroxyethyl)propionamide], potassium persulfate, sodium persulfate, ammonium persulfate, 4,4'-azobis-4-cyanovaleric acid ammonium (or amine) salt or the like are preferred.

Said polymerization initiator (D) may be added in advance to the polymerization vessel, or directly before initiation of the polymerization, or in advance to the mixed solution of (A) [and (E)] and (B) before the emulsification (to be mentioned later herein) to attain an oil droplet diameter not more than 1,000 nm or to the mixed solution of the partial condensate of (A) or (A') and (E) and (B) before emulsification, or after the emulsion after said emulsification.

According the present invention, it is also preferred that a hydrolysis inhibitor (F) be further added to carry out the polymerization stably. Said inhibitor (F) is not limited to any particular species but is preferably a compound containing an acidic functional group neutralized with a base and/or an amine imide group. As such compound, there may be mentioned high-molecular compounds having a dispersing function, compounds having a pH-buffering function, compounds having a radical polymerization function and the like. High molecular compounds having a dispersing function are preferred, however.

First, the high-molecular compounds having a dispersing function are described. As said compounds, there may be mentioned high-molecular compounds having an acidic functional group such as a sulfo group, a carboxyl group, a phosphoric acid group or the like, neutralized with a base. Preferred are high-molecular compounds derived from carboxyl-containing polymers by neutralization with a base.

Said carboxyl-containing polymers are obtained by homopolymerization of a carboxyl-containing monomer such as (meth) acrylic acid, crotonic acid, fumaric acid, maleic acid (anhydride), itaconic acid, citraconic acid, ricinolic acid or the like (preferably (meth)acrylic acid or fumaric acid) or copolymerization of such monomer with one or more other unsaturated monomers.

High-molecular compounds containing an amine imide group are also preferred, and said high-molecular compounds are obtained by homopolymerization of an amine imide group-containing monomer or copolymerization thereof with one or more unsaturated monomers. As such amine imide group-containing monomer, there may be mentioned 1,1,1-trimethylamine methacrylimide, 1,1-dimethyl-1-ethylamine methacrylimide, 1,1-dimethyl-1-(2-hydroxypropyl)amine methacrylimide, 1,1-dimethyl-1-(2'-phenyl-2'-hydroxyethyl)amine methacrylimide, 1,1-dimethyl-1-(2'-hydroxy-3'-phenoxypropyl)amine methacrylimide, 1,1,1-trimethylamine acrylimide and monomers represented by the formulas (8) and (9) shown below.

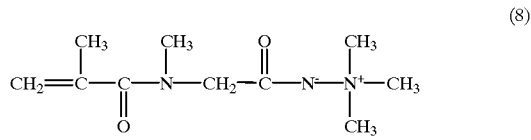

(8)

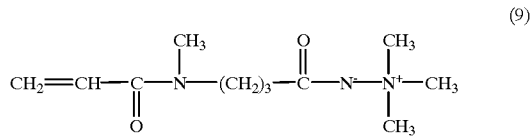

(9)

Said other unsaturated monomers to be used include (meth)acrylic esters such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, n-hexyl methacrylate, lauryl methacrylate, etc., vinyl acetate, styrene, fatty acid esters such as vinyl versatate etc., and so forth. These are used either singly or in combination.

The molecular weight of such a high-molecular compound is not critical but, when expressed in terms of number average molecular weight, it is preferably 500 to 500,000, more preferably 700 to 30,000. When said molecular weight is less than 500, the stability in the step of coating composition polymerization will be reduced. When it exceeds 500,000, the viscosity will be very high, hence an uneconomically large amount of a solvent will be required in the step of polymerization.

As the basic compound to be used for further neutralizing the carboxyl-containing copolymers such as mentioned above, there may be mentioned ammonia, N,N-dimethylethanolamine, diethylamine, triethylamine, morpholine, 2-dimethylamino-2-methyl-1-propanol, monoisopropanolamine, monoethanolamine, N,N-diethylethanolamine, 2-amino-2-methyl-1-propanol, N-methyldiethanolamine, diisopropanolamine, N-ethyldiethanolamine, triisopropanolamine, triethanolamine and the like. The use of ammonia or diethylamine is preferred, however.

Mention is now made of the case in which the hydrolysis inhibitor (F) is a compound having a pH buffering function. Said compound may be any one capable of maintaining the reaction system at a pH of 6 to 10, without any particular restriction. More specifically, there may be mentioned sodium hydrogen carbonate, potassium hydrogen carbonate, monosodium phosphate, monopotassium phosphate, disodium phosphate, trisodium phosphate, sodium acetate, ammonium acetate, sodium formate, ammonium formate and the like.

As said hydrolysis inhibitor (F), two or more compounds of the same type or of different types may be used in combination.

In addition to the components (A) to (F), one or more known additives, such as chain transfer agents, antifoams, preservatives, rust inhibitors, ultraviolet absorbers, antioxidants and the like, may be added in amounts in which the effects of the present invention will not be sacrificed. For promoting the curing of coatings, a curing agent, for example an organometallic compound such as an organotin or organoaluminum compound, may be added. Said curing agent may also be added in the form an emulsion.

In the following, detailed mention is made of the method of obtaining an aqueous emulsion by preliminary emulsification of the above-mentioned polyalkoxypolysiloxane (A) (if necessary in combination with the monomer (E) containing at least one functional group, which is a hydrolyzable silyl group, a hydroxyl group or an epoxy group; or the partial condensate of a polyalkoxypolysiloxane (A) or a tetraalkoxysilane (A') and an unsaturated monomer (E) containing at least one functional group, which is a hydrolyzable silyl group, a hydroxyl group or an epoxy group in lieu of the polyalkoxypolysiloxane (A)) and the unsaturated monomer (B) in an aqueous medium containing the emulsifier (C) so as to attain an oil droplet diameter not more than 1,000 nm.

As regards the method of charging the above respective components, it is preferred that (C) be dissolved in water and the other components be then charged.

First, for the case of using (A) and (B) [if necessary together with (E)], the proportions of the components are described.

The proportions of (A) and (B) [if necessary together with (E)] are not critical but are preferably such that (A)/(B)/(E)=1–70/99–30/0–50, more preferably 3–50/97–50/0–20.

Proportions outside the above ranges are unfavorable, since the shelf stability of the resulting coating composition may be reduced and/or the coatings obtained from the coating composition may be unsatisfactory in weather resistance, solvent resistance and stain resistance.

The proportion of the emulsifier (C) is preferably 0.1 to 10 parts by weight, more preferably 0.3 to 5 parts by weight, per 100 parts by weight of the sum of (A) and (B) [(A), (B) and (E) when (E) is present]. When it is less than 0.1 part by weight, it is impossible to achieve emulsification to an oil droplet diameter of not more than 1,000 nm and to carry out the polymerization stably. Proportions exceeding 10 parts by weight are unfavorable, since the coatings formed from the resulting coating composition will be poor in water resistance.

In the case of incorporation of the hydrolysis inhibitor (F), the proportion thereof is preferably 0.01 to 10 parts by weight, more preferably 0.03 to 3 parts by weight, per 100 parts by weight of the sum of (A) and (B) [(A), (B) and (E) when (E) is present]. When it is less than 0.01 part by weight, a sufficient level of polymerization stability will not be obtained. Proportions exceeding 10 parts by weight are unfavorable, since the coatings formed from the resulting coating composition will be poor in water resistance and/or the polymerization stability will be reduced in some instances.

The proportion of water is preferably 50 to 400 parts by weight, more preferably 70 to 200 parts by weight, per 100 parts by weight of the sum of (A) and (B) [(A), (B) and (E) when (E) is present]. When it is less than 50 parts by weight, the aqueous emulsion will have a high viscosity and the polymerization stability will be reduced. Proportions exceeding 400 parts by weight are unfavorable, since the resulting aqueous emulsion will have a low concentration and the drying properties of the resulting coating composition in the step of producing coatings will be insufficient. It is to be noted that the water contained in the partial condensate should be included in said proportion of water.

Then, the proportions of the components are described with regard to the case of using the partial condensate (A+E) of (A) or (A') and (E) and (B).

The proportions of (A+E) and (B) are not critical but are preferably such that (A+E)/(B)=1–70/99–30, more preferably 3–50/97–50.

Proportions outside the above ranges are unfavorable, since the shelf stability of the resulting coating composition will be reduced and/or the coatings obtained from said coating composition will be unsatisfactory in weather resistance, solvent resistance and stain resistance.

The proportion of the emulsifier (C) is preferably 0.1 to 10 parts by weight, more preferably 0.3 to 5 parts by weight, per 100 parts by weight of the sum of (A+E) and (B). When it is less than 0.1 part by weight, it is impossible to stably carry out the polymerization for producing the coating composition. Proportions exceeding 10 parts by weight are unfavorable, since the coatings derived from the resulting coating composition will fail to have sufficient water resistance.

In the case of incorporation of the hydrolysis inhibitor (F), the proportion thereof is preferably 0.01 to 10 parts by weight, more preferably 0.03 to 3 parts by weight, per 100 parts by weight of the sum of (A+E) and (B). When it is less than 0.01 part by weight, a sufficient level of polymerization stability will not be obtained. Proportions exceeding 10 parts by weight are unfavorable, since the coatings derived from the resulting coating composition may acquire reduced water resistance and/or the polymerization stability may become poor in certain instances.

The proportion of water is preferably 50 to 400 parts by weight, more preferably 70 to 200 parts by weight, per 100 parts by weight of the sum of (A+E) and (B). When it is less than 50 parts by weight, the aqueous emulsion will have a high viscosity. Proportions exceeding 400 parts by weight are unfavorable, since the resulting aqueous emulsion will have a low concentration and the drying properties of the resulting coating composition in the step of producing coatings will become poor. It is to be noted that the water contained in the partial condensate should be included in said proportion of water.

For emulsifying oil droplets to a diameter not more than 1,000 nm, it is necessary to use an emulsification apparatus such as a high-pressure homogenizer or an sonicator. In using a high-pressure homogenizer, the pressure is preferably 10 to 1,500 kg/cm$^2$, more preferably 30 to 1,000 kg/cm$^2$.

If the temperature in the step of emulsification may be such that the composition will not undergo any reaction during emulsification, no problem will be encountered. An appropriate temperature range is thus about 5 to 60° C. The number of passes of the emulsion is preferably about 1 to 5.

It is preferred that, prior to the above emulsification, preliminary emulsification be conducted by stirring, vibrating or the like.

It is necessary, by using the emulsification apparatus mentioned above, to emulsify the oil droplet components such as (A) and (B) [plus (E) as necessary] or (A+E) and (B) in an aqueous medium so as to reduce the oil droplet diameter to or below 1,000 nm, preferably 50 to 1,000 nm, more preferably 100 to 500 nm. Oil droplet diameters exceeding 1,000 nm are inappropriate, since the polymerization stability of the coating composition will be reduced.

After completion of the above emulsification, the emulsion is heated to initiate the polymerization. As the method therefor, there may be mentioned the techniques comprising (1) subjecting the whole amount of the emulsion to polymerization by raising the temperature thereof, (2) subjecting a part of the emulsion to polymerization by raising the temperature thereof and then adding the remaining emulsion dropwise to thereby continue the polymerization, or (3) charging the reaction vessel with water (if necessary together with a portion of the emulsifier and a portion or the whole of the hydrolysis inhibitor and the polymerization initiator) and raising the temperature and then adding the whole amount of the emulsion dropwise, portionwise or continuously thereto to thereby carry out the polymerization, for instance. From the viewpoint of ease of control of the polymerization temperature and of good polymerization stability, the method (3) is preferred, however.

The polymerization initiator (D) is used preferably in an amount of 0.03 to 2 parts by weight, more preferably 0.05 to 1 part by weight, per 100 parts by weight of the sum of (A) and (B) [(A), (B) and (E) when (E) is present]. When (A+E) is used, it is used preferably in an amount of 0.03 to 2 parts by weight, more preferably 0.05 to 1 part by weight, per 100 parts by weight of the sum of (A+E) and (B).

When the amount of (D) is below the above range, the rate of polymerization will be slow. When it exceeds the above range, the coatings derived from the resulting coating composition may unfavorably acquire reduced solvent resistance and weather resistance in some cases.

As regards the polymerization conditions for the method (1) mentioned above, a temperature range of about 40 to 90° C. is generally suitable, and the reaction will be complete in about 1 to 8 hours after starting the temperature raising.

As regards the polymerization conditions for the method (2) mentioned above, 5 to 50% by weight of the reaction liquid is subjected to polymerization at 40 to 90° C. for 0.1 to 4 hours and then the remaining portion of the reaction liquid is added dropwise over about 1 to 5 hours and, thereafter, maturation is effected at the same temperature for about 1 to 3 hours.

As for the polymerization conditions for the method (3) mentioned above, water is charged in an amount of 5 to 100% by weight relative to the reaction liquid, the temperature is raised to 40 to 90° C., the reaction liquid is added dropwise over about 2 to 5 hours and, then, maturation is effected at the same temperature for about 1 to 3 hours.

The above polymerization presumably gives a composition having the structure such as mentioned below. First, a coating composition mainly composed of emulsion particles having a network structure resulting from intercalation or interpenetration of polymers of (A) and (B) and/or a graft structure of the polyalkoxypolysiloxane as resulting from binding of (A) to polymers of (B) via (E).

Such polymers occur as minute particles having a particle size of 50 to 1,000 nm and the resulting coating compositions are excellent in shelf stability and in various performance characteristics, such as film forming ability, adhesiveness, chemical resistance, luster, water resistance, weather resistance and stain resistance, and are useful as building material coating compositions, adhesives, paper coating compositions and the like.

EXAMPLES

The following examples are further illustrative of the present invention. In the following description, "%" and "part(s)" mean "% by weight" and "part(s) by weight", respectively.

Example 1

A flask equipped with a condenser, a thermometer and a stirrer was charged with 25 parts of polyethoxypolysiloxane (A) [Ethyl Silicate 40, product of Colcoat Co.], 10 parts of γ-methacryloxypropyltrimethoxysilane (E), 0.94 part of water and 0.3 part of formic acid, and the reaction was carried out for 30 hours at room temperature and then the byproduct ethanol and formic acid were distilled off at 40° C. under reduced pressure to give a partial condensate.

Separately, a flask equipped with a condenser, a thermometer and a stirrer was charged with 100 parts of isopropyl alcohol, and the temperature was raised to 80° C. Then, a mixed solution composed of 15 parts of acrylic acid, 35 parts of methyl methacrylate, 50 parts of 2-ethylhexyl acrylate and 1.0 part of azobisisobutyronitrile was added dropwise at 80° C. over 4 hours and the polymerization was further carried out at 80° C. for 3 hours. Then, aqueous ammonia was added with stirring, the isopropyl alcohol was then distilled off and, finally, the pH was adjusted to 8.0 with aqueous ammonia, to give an aqueous solution (25%) of a hydrolysis inhibitor (F).

Then, 2 parts of an emulsifier (C) [SE-10N, product of Asahi Denka Kogyo] and 4 parts of the above hydrolysis inhibitor (F) were dissolved in 128.5 parts of water [inclusive of the water contained in (F)], and a solution of 0.5 part of azobisisobutyronitrile in a mixture of 35 parts of the partial condensate mentioned above and 90 parts of a mixed unsaturated monomer (B) [45 parts of methyl methacrylate and 45 parts of n-butyl acrylate] was added, followed by stirring for mixing and preliminary emulsification. This preliminary emulsion was subjected to one pass treatment in a high-pressure homogenizer (product of Gaulin) at a pressure of 500 kg/cm$^2$ and at ordinary temperature, whereby an emulsion having oil droplets with a diameter of 200 nm was prepared.

A polymerization vessel was charged with 64.25 parts of water, the temperature was raised to 80° C., and the above emulsion was added dropwise over 4 hours for effecting the polymerization. After the dropping, the polymerization was further continued at 80° C. for 2 hours and, after cooling, the pH was adjusted to 8.5 with 5% aqueous ammonia, to give a silicone-containing aqueous coating composition (emulsion). Said emulsion was subjected to the following evaluation tests. (Oil droplet diameter and mean particle size)

The oil droplet diameter after emulsification and the mean particle size after emulsion polymerization were determined using an Otsuka Denshi model DLS-700 laser beam scattering particle size meter.

(Nonvolatile matter)

The nonvolatile matter was determined under the conditions prescribed in JIS K 6828.

(viscosity)

The viscosity was determined at 25° C. using the rotary viscometer and conditions prescribed in JIS K 7117.

(pH value)

The pH value was determined using the pH meter prescribed in JIS Z 8802.

(Coarse particle fraction)

The emulsion obtained was filtered through a 100-mesh wire gauze, the residue on the wire gauze was dried at 105° C. for 1 hour, and the weight of the coarse particles thus obtained was expressed in terms of weight per 100 g of emulsion.

(Residual alcohol)

After centrifugation of the emulsion, the aqueous layer was subjected to residual alcohol determination using a Hitachi model 163 FID gas chromatograph.

(Shelf stability)

The emulsion was allowed to stand at room temperature for 3 months and then its state was observed by the eye.
○... No change;
Δ... Slight viscosity increase;
X... Viscosity increase or gelation.
(odor)

The emulsion was evaluated for odor.
○... Little odor;
Δ... Slight odor;
X... Strong odor.
(Weather resistance)

The emulsion was casted onto a glass plate (using an applicator under conditions such that a coat thickness of 100 μm was obtained) and, after 7 days of drying at room temperature, the coating was subjected to outdoor exposure for 6 months. The state of the coating was then observed by the eye.
◎... The coating was glossy and transparent;
○... The coating was in good condition only with a slight decrease in luster;
Δ... A decrease in luster and destruction of the coating were observed;
X... A marked decrease in luster and marked destruction (whitening, cracking) of the coating were observed.
(Stain resistance)

The emulsion was casted onto a glass plate (using an applicator under conditions such that a coat thickness of 100 μm was obtained) and, after 7 days of drying at room temperature, the coating was subjected to outdoor exposure for 6 months. The coating was then checked for rainwater streaks by the eye.
◎... Rainwater streaks were hardly observed;
○... Faint rainwater streaks were partly observed;
Δ... Rainwater streaks were observed here and there;
X... Clear rainwater streaks were observed all over the surface.
(Water resistance)

The emulsion was casted onto a glass plate and, after 7 days of drying at room temperature, the coated plate was immersed in distilled water for 24 hours. The surface condition was then observed by the eye.
◎... No whitening or swelling was observed;
○... Slight whitening was observed but no swelling was observed;
Δ... Whitening and swelling were observed;
X... Advanced whitening and swelling were observed, with elution in places.
(Solvent resistance)

The emulsion was casted onto a glass plate and, after 7 days of drying at room temperature, the coated plate was immersed in ethyl acetate for 24 hours. The surface condition was then observed by the eye.
◎... No change;
○... Slight swelling and whitening were observed on the surface;
Δ... swelling and whitening were observed all over the surface;
X... Advanced swelling and whitening were observed, with falling off of the coating from the glass plate.

Example 2

A coating composition was obtained and evaluated in the same manner as in Example 1 except that 10 parts of 2-hydroxyethyl methacrylate (E) was used in lieu of 10 parts of γ-methacryloxypropyltrimethoxysilane (E) used in producing the partial condensate.

Example 3

A coating composition was obtained and evaluated in the same manner as in Example 1 except that 10 parts of glycidyl methacrylate (E) was used in lieu of 10 parts of γ-methacryloxypropyltrimethoxysilane (E) used in producing the partial condensate.

Example 4

An emulsion with an oil droplet diameter of 200 nm was prepared in the same manner as in Example 1 except that, in the step of emulsion preparation, the amount of water was increased from 128.5 parts to 192.75 parts. A polymerization vessel was charged with 10% of said emulsion, the temperature was raised to 80° C. and, after 15 minutes of polymerization, the remaining 90% portion of the emulsion was added dropwise over 4 hours. Further, maturation was effected at 80° C. for 2 hours. The thus-obtained silicone-containing aqueous coating composition was evaluated in the same manner as in Example 1.

Example 5

A coating composition was obtained and evaluated in the same manner as in Example 1 except that 4 parts of a 25% aqueous solution of ammonium acetate was used as the hydrolysis inhibitor (F).

Example 6

A coating composition was obtained and evaluated in the same manner as in Example 1 except that 90.8 parts of a mixed unsaturated monomer (B) [mixture of 45 parts of methyl methacrylate, 45 parts of n-butyl acrylate and 0.8 part of a 25% aqueous solution of ammonium methacrylate] was used in lieu of 90 parts of the mixed unsaturated monomer (B) [mixture of 45 parts of methyl methacrylate and 45 parts of n-butyl acrylate].

Example 7

A coating composition was obtained and evaluated in the same manner as in Example 1 except that, in the partial condensate production, the same amount of polymethoxy-polysiloxane [MS51, product of Mitsubishi Chemical Corp.] (A) was used in lieu of polyethoxypolysiloxane [Ethyl Silicate 40, product of Colcoat] (A).

Example 8

A coating composition was obtained and evaluated in the same manner as in Example 1 except that, in the step of emulsification, 25 parts of polyethoxy-polysiloxane was used in lieu of 35 parts of the partial condensate and that 100 parts of a mixed unsaturated monomer (B) [mixture of 50 parts of methyl methacrylate and 50 parts of n-butyl acrylate] was used in lieu of 90 parts of the mixed unsaturated monomer (B) [mixture of 45 parts of methyl methacrylate and 45 parts of n-butyl acrylate].

Example 9

A coating composition was obtained and evaluated in the same manner as in Example 1 except that, in the step of emulsification, 25 parts of polyethoxypolysiloxane and 10 parts of γ-methacryloxypropyltrimethoxysilane (E) was used in lieu of 35 parts of the partial condensate.

Example 10

A coating composition was obtained and evaluated in the same manner as in Example 1 except that, in the partial condensate production, the same amount of tetraethoxysilane (A') was used in lieu of polyethoxypolysiloxane [Ethyl Silicate 40, product of Colcoat] (A).

Comparative Example 1

A coating composition was obtained and evaluated in the same manner as in Example 1 except that, in the step of emulsification, an ordinary homogenizer (Mitamura Riken Kogyo model LD-X10/20) was used in lieu of the high-pressure homogenizer to attain an oil droplet diameter of 2,000 nm.

Comparative Example 2

A coating composition was obtained and evaluated in the same manner as in Example 1 except that, in the step of emulsification, 10 parts of γ-methacryloxypropyltrimethoxysilane (E) was used in lieu of 35 parts of the partial condensate.

The evaluation results obtained in the above examples and comparative examples are shown in Table 1.

TABLE 1

| | Oil droplet diameter (nm) | Non-volatile matter (%) | Viscosity (cps) | pH | Mean particle size (nm) | Coarse particles (mg/100 g emulsion) | Residual alcohol (%) | Odor |
|---|---|---|---|---|---|---|---|---|
| Example 1 | 200 | 36.0 | 10 | 8.5 | 200 | 0.1 | 0.1 | ○ |
| Example 2 | 200 | 36.4 | 15 | 8.5 | 190 | 0.1 | 0.1 | ○ |
| Example 3 | 210 | 36.3 | 10 | 8.5 | 200 | 0.2 | 0.1 | ○ |
| Example 4 | 200 | 36.0 | 10 | 8.5 | 220 | 1.0 | 0.2 | ○ |
| Example 5 | 180 | 36.0 | 12 | 8.5 | 200 | 0.5 | 0.3 | ○ |
| Example 6 | 200 | 36.1 | 14 | 8.5 | 210 | 0.2 | 0.2 | ○ |
| Example 7 | 180 | 36.7 | 14 | 8.5 | 210 | 0.1 | 0.2 | ○ |
| Example 8 | 200 | 36.4 | 12 | 8.5 | 200 | 0.1 | 0.3 | Δ |
| Example 9 | 190 | 36.0 | 11 | 8.5 | 200 | 0.1 | 0.3 | Δ |
| Example 10 | 200 | 36.1 | 10 | 8.5 | 200 | 0.1 | 0.3 | ○ |
| Compar. Example 1 | 2000 | 34.0 | 12 | 8.5 | 150 | 500 | 2.0 | x |
| Compar. Example 2 | 200 | 39.0 | 10 | 8.5 | 180 | 1.0 | 0.1 | ○ |

TABLE 2

| | Shelf stability | Weather resistance | Stain resistance | Water resistance | Solvent resistance |
|---|---|---|---|---|---|
| Example 1 | ○ | ⊚ | ⊚ | ⊚ | ⊚ |
| Example 2 | ○ | ○ | ⊚ | ○ | ○ |
| Example 3 | ○ | ○ | ⊚ | ⊚ | ○ |
| Example 4 | ○ | ⊚ | ⊚ | ⊚ | ⊚ |
| Example 5 | ○ | ⊚ | ⊚ | ○ | ⊚ |
| Example 6 | ○ | ⊚ | ⊚ | ○ | ⊚ |
| Example 7 | ○ | ⊚ | ⊚ | ⊚ | ⊚ |
| Example 8 | ○ | ○ | ○ | ○ | ○ |
| Example 9 | ○ | ⊚ | ○ | ⊚ | ⊚ |
| Example 10 | ○ | ⊚ | ⊚ | ⊚ | ⊚ |
| Compar. Example 1 | x | Δ | x | x | x |
| Compar. Example 2 | ○ | Δ | x | x | Δ |

Effects of the Invention

The aqueous coating composition of the present invention as produced by subjecting an aqueous emulsion prepared in advance by emulsification in an aqueous medium containing a polyalkoxypolysiloxane (A), an unsaturated monomer (B) and an emulsifier (C) so as to attain an oil droplet diameter not more than 1,000 nm to polymerization in the presence of a polymerization initiator (D) is excellent in shelf stability of the emulsion and in weather resistance, stain resistance, water resistance and solvent resistance of coatings derived therefrom.

What is claimed is:

1. A method of producing silicone-containing aqueous coating compositions which comprises subjecting an aqueous emulsion prepared in advance by emulsification in an aqueous medium containing a polyalkoxypolysiloxane (A) represented by the general formula (1):

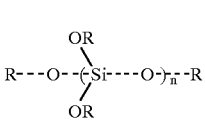

(1)

wherein n represents the mean degree of condensation and is a value of 2 or more, R represents an alkyl, aryl or aralkyl group and the R groups may be the same or different in the number of carbon atoms and may be straight or branched, an unsaturated monomer (B) capable of radical polymerization, the unsaturated monomer (B) excluding an unsaturated monomer (E) containing at least one functional group, which is a hydrolyzable silyl group, a hydroxyl group or an epoxy group, an emulsifier (C) and a hydrolysis inhibitor (F) so as to attain an oil droplet diameter not more than 1,000 nm to polymerization of the unsaturated monomer (B) in the presence of a polymerization initiator (D).

2. A method of producing silicone-containing aqueous coating compositions as claimed in claim 1, wherein the hydrolysis inhibitor (F) is a compound containing an acidic functional group neutralized with a base and/or an amine imide group.

3. A method of producing silicone-containing aqueous coating compositions as claimed in claim 2, wherein the compound containing an acidic functional group neutralized with a base and/or an amine imide group is a high-molecular compound having a dispersing function.

4. A method of producing silicone-containing aqueous coating compositions as claimed in claim 2, wherein the compound containing an acidic functional group neutralized with a base and/or an amine imide group is a compound having a pH-buffering function.

5. A method of producing silicone-containing aqueous coating compositions as claimed in claim 1, wherein the emulsifier (C) is a reactive surfactant.

6. A method of producing silicone-containing aqueous coating compositions which comprises subjecting an aqueous emulsion prepared in advance by emulsification in an aqueous medium containing a polyalkoxypolysiloxane (A) represented by the general formula (1):

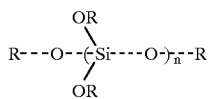

(1)

wherein n represents the mean degree of condensation and is a value of 2 or more and it maybe such that the above compound has fluidity at ordinary temperature, R represents an alkyl, aryl or aralkyl group and the R groups may be the same or different in the number of carbon atoms and may be straight or branched,

- an unsaturated monomer (B) capable of radical polymerization, the unsaturated monomer (B) excluding an unsaturated monomer (E) containing at least one functional group, which is a hydrolyzable silyl group, a hydroxyl group or an epoxy group,
- an emulsifier (C),
- a hydrolysis inhibitor (F), and
- an unsaturated monomer (E) containing at least one functional group, which is a hydrolyzable silyl groups, a hydroxyl group or an epoxy group, so as to attain an oil droplet diameter not more than 1,000 nm to polymerization of the unsaturated monomer (B) and the unsaturated monomer (E) in the presence of a polymerization initiator (D).

7. A method of producing silicone-containing aqueous coating compositions which comprises subjecting an aqueous emulsion prepared in advance by emulsification in an aqueous medium containing i. a partial condensate of a polyalkoxypolysiloxane (A) represented by the general formula (1):

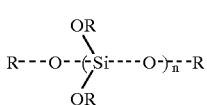

(1)

wherein n represents the mean degree of condensation and is a value of 2 or more and it may be such that the above compound has fluidity at ordinary temperature, R represents an alkyl, aryl or aralkyl group and the R groups may be the same or different in the number of carbon atoms and may be straight or branched, and

- an unsaturated monomer (E) containing at least one functional group, which is a hydrolyzable silyl group, a hydroxyl group or an epoxy group, ii. an unsaturated monomer (B) capable of radical polymerization, the unsaturated monomer (B) excluding an unsaturated monomer (E) containing at least one functional group, which is a hydrolyzable silyl group, a hydroxyl group or an epoxy group, iii. an emulsifier (C) and iv. a hydrolysis inhibitor (F) so as to attain an oil droplet diameter not more than 1,000 nm to polymerization of the unsaturated monomer (B) and the unsaturated monomer (E) in the presence of a polymerization initiator (D).

* * * * *